US009898945B2

(12) United States Patent
Chang et al.

(10) Patent No.: US 9,898,945 B2
(45) Date of Patent: Feb. 20, 2018

(54) DISPLAY PANEL AND METHOD FOR VERIFYING DATA LINES THEREON

(71) Applicant: AU Optronics Corporation, Hsin-Chu (TW)

(72) Inventors: Cheng-Liang Chang, Hsin-Chu (TW); Hsing-Lung Lee, Hsin-Chu (TW); Tsung-Jieh Shiao, Hsin-Chu (TW); Che-Ming Yang, Hsin-Chu (TW); Yuh-Huah Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/446,129

(22) Filed: Mar. 1, 2017

(65) Prior Publication Data

US 2017/0256188 A1 Sep. 7, 2017

(30) Foreign Application Priority Data

Mar. 2, 2016 (TW) ............................. 105106323 A

(51) Int. Cl.
*G06F 3/038* (2013.01)
*G09G 3/00* (2006.01)

(52) U.S. Cl.
CPC ..... *G09G 3/006* (2013.01); *G09G 2300/0809* (2013.01); *G09G 2330/12* (2013.01)

(58) Field of Classification Search
CPC ........... G09G 3/00; G09G 3/006; G09G 3/36; G09G 2300/0809; G09G 2330/12; G01R 31/28
USPC .......................................................... 345/214
See application file for complete search history.

(56) References Cited

U.S. PATENT DOCUMENTS

| | | | | |
|---|---|---|---|---|
| 9,418,582 B2 | 8/2016 | Chang et al. | | |
| 2005/0146349 A1* | 7/2005 | Lai | G09G 3/006 | 324/760.02 |
| 2007/0120790 A1* | 5/2007 | Jeon | G09G 3/006 | 345/87 |
| 2008/0007504 A1* | 1/2008 | Kawaura | G09G 3/006 | 345/89 |
| 2012/0162165 A1* | 6/2012 | Lee | G09G 3/006 | 345/206 |
| 2016/0041412 A1 | 2/2016 | Lv | | |

FOREIGN PATENT DOCUMENTS

TW I435093 B 3/2014

* cited by examiner

*Primary Examiner* — Kent Chang
*Assistant Examiner* — Mark Edwards
(74) *Attorney, Agent, or Firm* — WPAT, PC

(57) ABSTRACT

A display panel includes a substrate, a display area, N data lines, first switches, second switches, third switches, and fourth switches. A first peripheral circuit zone, a second peripheral circuit zone, and a display area are defined on a first surface of the substrate, and located between the first peripheral circuit zone and the second peripheral circuit zone. A display area circuit is located in the display area. Each of the N data lines crosses the display area circuit from the first peripheral circuit zone to the second peripheral circuit zone, and N is a positive integer greater than 1. The first switches are located in the first peripheral circuit zone. The second switches are located in the first peripheral circuit zone. The third switches are located on the first surface. The fourth switches are located in the second peripheral circuit zone.

18 Claims, 5 Drawing Sheets

DISPLAY PANEL AND METHOD FOR VERIFYING DATA LINES THEREON

TECHNICAL FIELD

The present invention relates to a display panel and a method for verifying data lines thereon, and specifically, to a display panel with a test circuit and a method for verifying data lines thereon.

BACKGROUND ART

Generally, a display panel has to undergo a test process before it is sent out for distribution, to ensure that a display panel's routing layout is arranged properly. One test solution for display panels is performed through a test circuit formed of transistors connected in series. Another test solution is known as laser cut. For this test solution, a test circuit is disposed on a display panel in the manufacturing process of display panels. After the test, the test circuit is cut off from the display panel through laser cutting.

However, disadvantages are found in both test solutions of display panels. For the laser cut test solution, because the test circuit is cut off in the end, the element size of the test circuit is not a concern. After the test circuit is cut off, however, any relevant electrical property test cannot be performed on the display panel. In other words, a vendor receiving a panel from a panel factory cannot perform relevant electrical property tests on the display panel, and thus makes it impossible to perform an incoming quality control (IQC). On the other hand, for the test solution performed through a plurality of transistors connected in series, volume miniaturization of a commonly formed thin film transistor has its limit. Further, the resolution of display panels has been enhanced continuously, making the size of a driving integrated circuit (IC) of a display panel being continuously reduced accordingly, resulting in a reduced line width or pitch of the driving IC of the display panel. Such a change has gone beyond the common capability of a current manufacturing process.

SUMMARY OF THE INVENTION

A display panel comprises a substrate, a display area circuit, N data lines, first switches, second switches, third switches, and fourth switches. A first peripheral circuit zone, a second peripheral circuit zone, and a display area are defined on a first surface of the substrate. The display area is located between the first peripheral circuit zone and the second peripheral circuit zone. The display area circuit is located in the display area. Each of the N data lines crosses the display area circuit from the first peripheral circuit zone to the second peripheral circuit zone, wherein N is a positive integer greater than 1. The first switches are located in the first peripheral circuit zone. The second switches are located in the first peripheral circuit zone. The third switches are located in the first peripheral circuit zone. The fourth switches are located in the second peripheral circuit zone. The first switches are configured to, according to a first signal, selectively and electrically connect (2k−1)-th data lines of the N data lines to a first data end or a second data end, wherein k is a positive integer and is not greater than N/2. The second switches are configured to, according to a second signal, selectively and electrically connect 2k-th data lines of the N data lines to the first data end or the second data end. The third switches are configured to, according to a third signal, selectively and electrically connect the 2k-th data lines of the N data lines to (2k+1)-th data lines of the N data lines. The fourth switches are configured to, according to a fourth signal, selectively and electrically connect the 2k-th data lines of the N data lines to the (2k−1)-th data lines of the N data lines.

A method for verifying data lines on a display panel disclosed in the present invention is applicable to the display panel. The method for verifying data lines on a display panel comprises: providing a first voltage for the first data end in the first place, and then providing a second voltage for the second data end, wherein the second voltage is different from the first voltage. Afterwards, controlling the first switches and the fourth switches to operate in a first state, and controlling the second switches and the third switches to operate in a second state, wherein the first state is different from the second state; and then determining whether the N data lines are normal according to a pattern displayed in the display area.

The above description of the content of the present invention and the following illustration of the embodiments are intended to demonstrate and explain the spirit and principle of the present invention and to provide further explanations of the claims of the present invention.

BRIEF DESCRIPTIONS OF THE DRAWINGS

DETAILED DESCRIPTIONS OF THE INVENTION

The following detailed description describes in detail the characteristics and advantages of the instant disclosure, whose content is sufficient to enable any person skilled in the relevant art to understand the technical content of the instant disclosure and implement accordingly, and according to the content, the claims and figures disclosed by the present specification, any person skilled in the relevant art can easily understand the purpose and advantages of the instant disclosure. The following embodiments further illustrate the aspects of the instant disclosure, but do not limit the scope of the instant disclosure with any aspect.

The present invention provides a display panel, wherein the display panel has a substrate, a display area circuit, N data lines, first switches, second switches, third switches, and fourth switches. It should be noted that N is a positive integer, and the value of N is decided as required by persons of ordinary skills in the art. In addition, when N has different values, the numbers of the first switches, the second switches, the third switches, and the fourth switches are increased or reduced correspondingly according to their connection relations.

Figure 1:
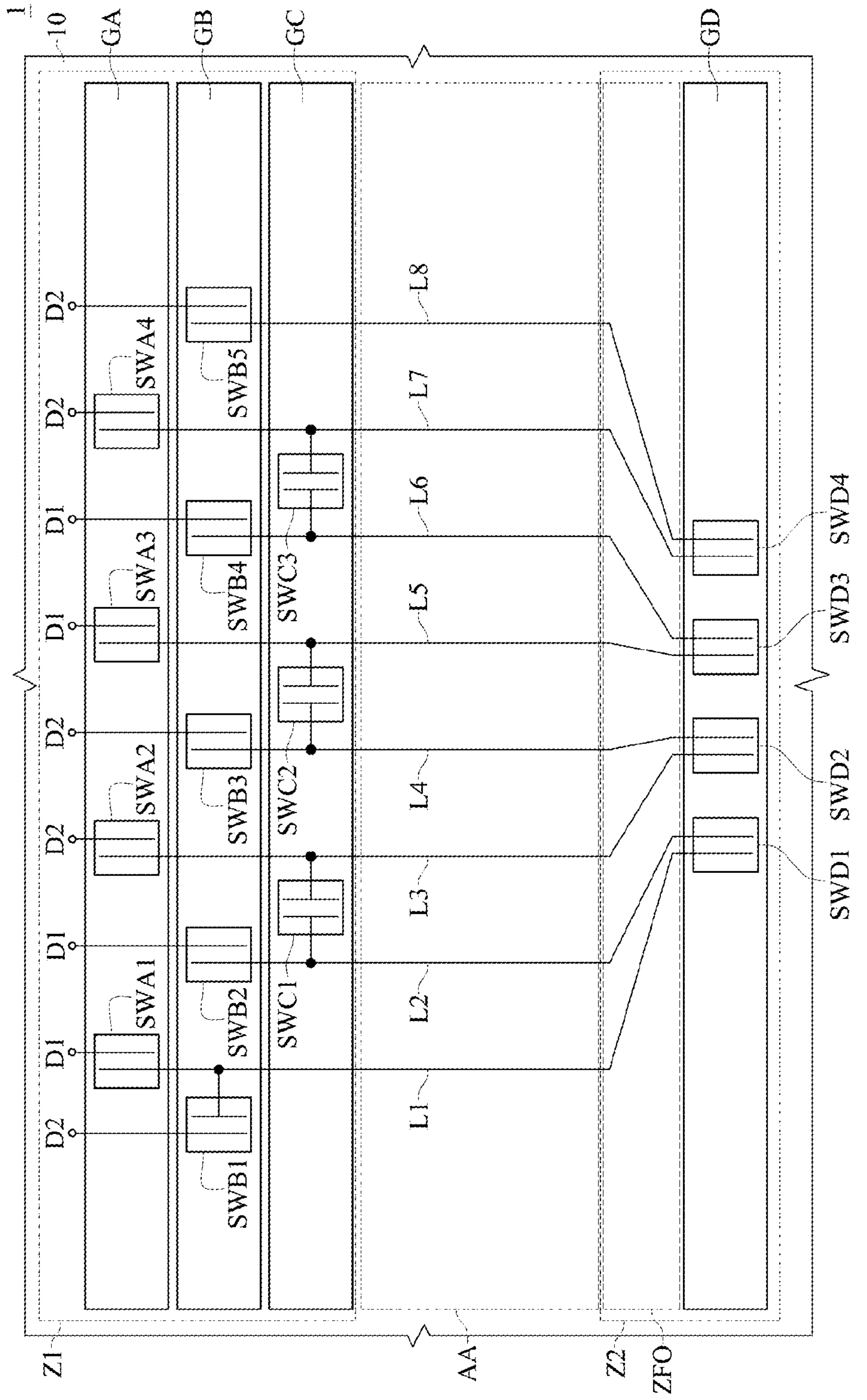
FIG. 1 is a top-view drawing of a display panel according to an embodiment of the present invention.
Figure 2:
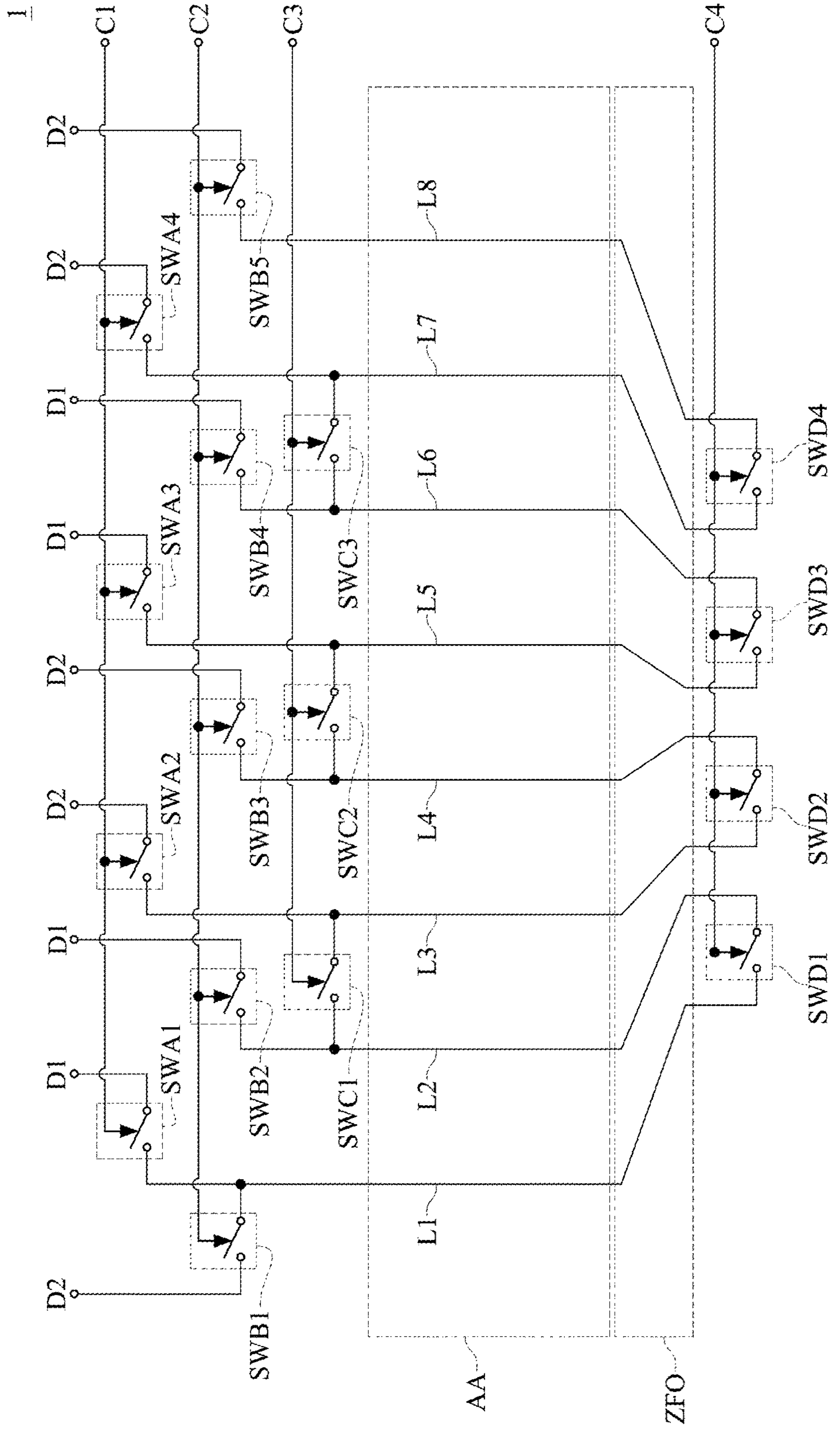
FIG. 2 is an equivalent circuit diagram of the display panel according to one embodiment of the present invention.

Referring to FIG. 1 and FIG. 2. FIG. 1 is a top-view drawing of a display panel according to an embodiment of the present invention, and FIG. 2 is an equivalent circuit diagram of the display panel according to the embodiment of the present invention. Here, for a concise description, in FIG. 1 and FIG. 2 and corresponding embodiments thereof, let N be 8; that is, the display panel 1 has data lines L1~L8. At this time, the display panel 1 has first switches SWA1~SWA4, second switches SWB1~SWB5, third switches SWC1~SWC3, and fourth switches SWD1~SWD4. The number and size of each element are not limited to those depicted in FIG. 1. The first switches SWA1~SWA4, the second switches SWB1~SWB5, the third switches SWC1~SWC3, and the fourth switches SWD1~SWD4 are, for example, n-type thin film transistors or p-type thin film transistors, and they are not limited hereto.

A first peripheral circuit zone Z1, a second peripheral circuit zone Z2, a display area AA, and a fan-out zone ZFO are defined on a first surface of the substrate 10. The display area AA is located between the first peripheral circuit zone Z1 and the second peripheral circuit zone Z2. The second peripheral circuit zone Z2 is provided with the fan-out zone ZFO, and the fan-out zone ZFO is close to the display area AA. The display area circuit is located in the display area AA. The structure of the display area circuit can be designed by persons of ordinary skills in the art as required, and the details are not depicted here. The display area circuit has, for example, pixel units. The pixel units, based on a data signal of a corresponding data line, selectively emit light. Basically, the display area circuit can be designed without restriction by persons of ordinary skills in the art and their needs, and the relevant details are not described.

The data lines L1~L8 cross the display area circuit from the first peripheral circuit zone Z1 to the second peripheral circuit zone Z2. The data lines L1~L8, the first switches SWA1~SWA4, the second switches SWB1~SWB5, the third switches SWC1~SWC3, and the fourth switches SWD1~SWD4 are shown in FIG. 1 and are not described here again. The first switches SWA1~SWA4 are located in the first peripheral circuit zone Z1. The second switches SWB1~SWB5 are located in the first peripheral circuit zone Z1. The third switches SWC1~SWC3 are located on a first surface of the substrate 10. The fourth switches SWD1~SWD4 are located in the second peripheral circuit zone Z2.

In the embodiment shown in FIG. 1, the first switches SWA1~SWA4 share a gate GA, the second switches SWB1~SWB5 share a gate GB, the third switches SWC1~SWC3 share a gate GC, and the fourth switches SWD1~SWD4 share a gate GD. The gate GA is electrically connected to a control end C1 to receive a first signal SC1; the gate GB is electrically connected to a control end C2 to receive a second signal SC2; the gate GC is electrically connected to a control end C3 to receive a third signal SC3; and the gate GD is electrically connected to a control end C4 to receive a fourth signal SC4. In this structure, the first switches SWA1~SWA4 are selectively and simultaneously turned on according to the first signal SC1; the second switches SWB1~SWB5 are selectively and simultaneously turned on according to the second signal SC2; the third switches SWC1~SWC3 are selectively and simultaneously turned on according to the third signal SC3; and the fourth switches SWD1~SWD4 are selectively and simultaneously turned on according to the fourth signal SC4. However, in another embodiment, the first switches SWA1~SWA4 may also not share the gate and are turned on according to different signals respectively; the second switches SWB1~SWB5 may also not share the gate and are turned on according to different signals respectively; the third switches SWC1~SWC3 may also not share the gate and are turned on according to different signals respectively; the fourth switches SWD1~SWD4 may also not share the gate and are turned on according to different signals respectively.

From another perspective, the first switches SWA1~SWA4 form a first switch group, the second switches SWB1~SWB5 form a second switch group, the third switches SWC1~SWC3 form a third switch group, and the fourth switches SWD1~SWD4 form a fourth switch group. Each switch group is selectively turned on according to different signals. This is only the difference of definition and it does not limit the application method of this application.

The first switches SWA1~SWA4 are configured to, according to the first signal SC1, selectively and electrically connect the (2k−1)-th data lines of the N data lines to a first data end D1 or a second data end D2, wherein k is a positive integer and is not greater than N/2. In other words, the first switches SWA1~SWA4 are configured to selectively couple the i-th (i being an odd number) data lines of the N data lines to the first data end D1 or the second data end D2 respectively. The display panel 1 receives a first data voltage through the first data end D1 and a second data voltage through the second data end D2.

Alternatively, from another perspective, the first switches SWA1~SWA4 are configured to selectively and electrically connect the (4m−3)-th data lines of the N data lines to the first data end D1 and to electrically connect the (4m−1)-th data lines of the N data lines to the second data end D2, wherein m is a positive integer and is not greater than N/4. The second switches SWB1~SWB5 are configured to selectively and electrically connect the (4m−2)-th data lines of the N data lines to the first data end D1 and to electrically connect the 4m-th data lines and the first data line of the N data lines to the second data end D2, wherein m is a positive integer and is not greater than N/4.

As described above, in this embodiment, let N be 8, so the data lines L1, L3, L5, and L7 are selectively coupled to the first data end D1 or the second data end D2 through the first switches SWA1~SWA4 respectively.

The second switches SWB2~SWB5 are configured to, according to the second signal SC2, selectively and electrically connect the 2k-th data lines of the N data lines to the first data end D1 or the second data end D2. In other words, the second switches SWB1~SWB5 are configured to selectively couple the j-th (j being an even number) data lines of the N data lines to the first data end D1 or the second data end D2 respectively. As described above, in this embodiment, let N be 8, so the data lines L2, L4, L6, and L8 are selectively coupled to the first data end D1 or the second data end D2 through the second switches SWB2~SWB5 respectively.

The third switches SWC1~SWC3 are configured to, according to a third signal, selectively and electrically connect the 2k-th data lines of the N data lines to the (2k+1)-th data lines of the N data lines. In the present embodiment, the third switches SWC1~SWC3 are configured to electrically connect the data lines L2, L4, and L6 to the data lines L3, L5, and L7 respectively.

The fourth switches SWD1~SWD4 are configured to, according to a fourth signal, selectively and electrically connect the 2k-th data lines of the N data lines to the (2k−1)-th data lines of the N data lines. In the present embodiment, the fourth switches SWD1~SWD4 are configured to electrically connect the data lines L1, L3, L5, and L7 to the data lines L2, L4, L6, and L8 respectively.

Figure 3:
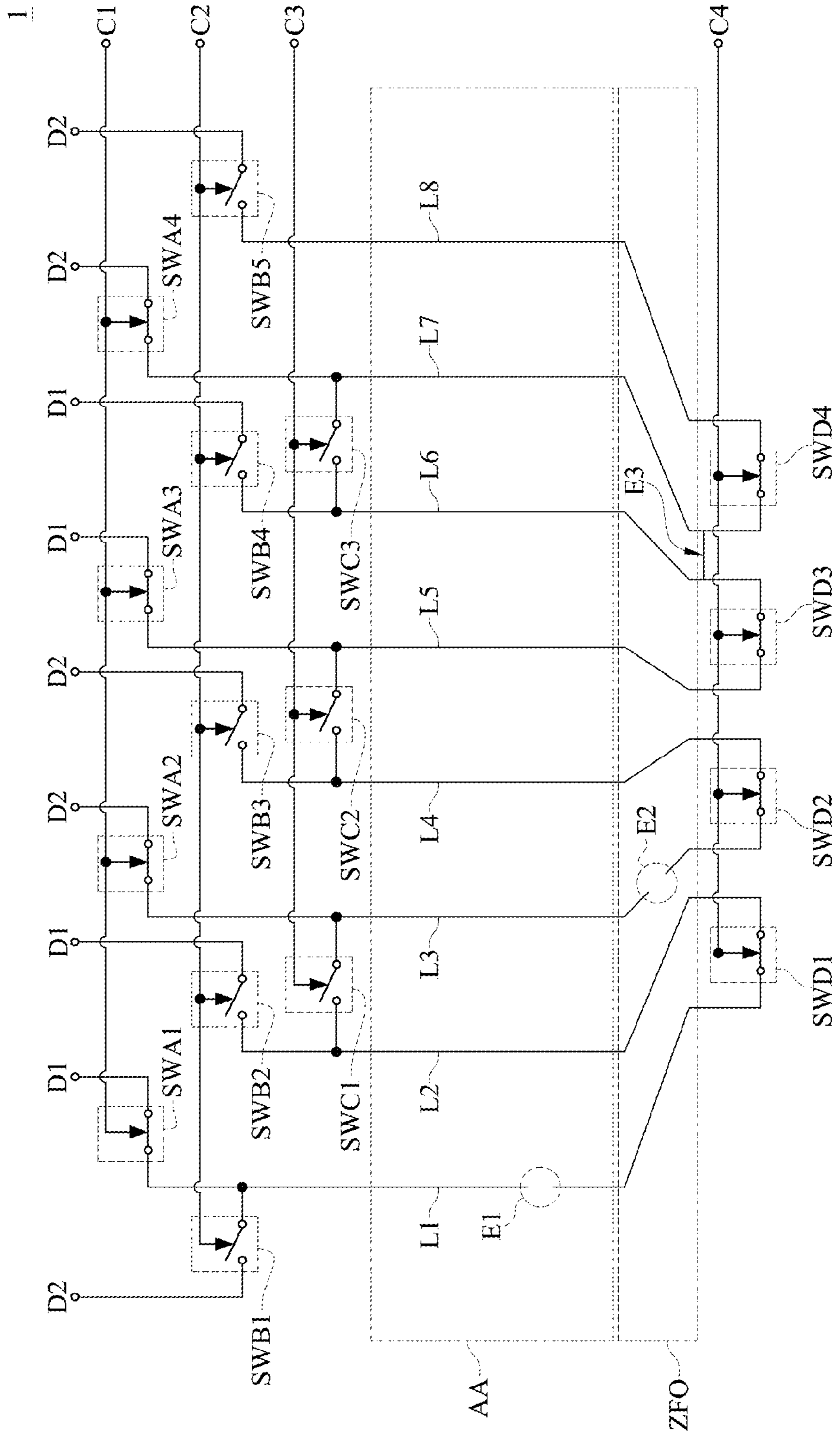
FIG. 3 is an equivalent circuit diagram of the display panel in the first test mode according to FIG. 2 of the present invention.

According to the above structure, the display panel 1 has multiple test modes, wherein different data voltages are used to test whether the data lines L1~L8 in different areas on the substrate are defective and form an open circuit, or whether a short circuit is formed among the data lines L1~L8. Referring to FIG. 3, a first test mode for the display panel 1 is illustrated. FIG. 3 is an equivalent circuit diagram of the display panel in the first test mode according to FIG. 2 of the present invention.

In the first test mode, the first switches SWA1~SWA4 and the fourth switches SWD1~SWD4 are turned on, the second switches SWB1~SWB5 and the third switches SWC1~SWC3 are not turned on. At this time, the data lines L1 and L5 are electrically connected to the first data end D1 through the first switches SWA1 and SWA3, and the data lines L3 and L7 are electrically connected to the second data end D2 through the first switches SWA2 and SWA4. The data lines L2, L4, L6, and L8 are electrically connected to the data lines L1, L3, L5, and L7 through the fourth switches SWD1~SWD4 respectively. Thus, ideally, voltage levels on the data lines L1 and L2 and voltage levels on the data lines L5 and L6 are the same and form the first data voltage, and voltage levels on the data lines L3 and L4 and voltage levels on the data lines L7 and L8 are the same and form the second data voltage. The display area circuit enables the pixel units to emit light with different brightness based on to the voltage levels of the data lines L1~L8.

In this embodiment, when a voltage level on a corresponding data line is a high voltage level, the display area circuit transmits a data signal into the pixel units to enable the pixel units to emit light. Each of the data lines L1~L8 corresponds to one pixel unit column in the display area circuit. Thus, in this embodiment, each pixel unit, corresponding to the data lines L1~L8, emits consistent and roughly the same amount of light. However, as shown in FIG. 3, in this embodiment, the display panel 1 has, for example, the following flaws. The data line L1 forms an open circuit in the display area AA because of a flaw E1; the data line L3 forms an open circuit in the fan-out zone ZFO because of a flaw E2; and the data lines L6 and L7 form a short circuit because of a flaw E3. Thus, the voltage levels on the data lines L1 L8 are not ideal as described above. In other words, light emitted from the pixel units, corresponding to the data lines L1~L8, will not be consistent.

In order to test whether a short circuit or an open circuit is formed in the display panel 1, the first test mode may include a first open circuit test mode and a first short circuit test mode to test the display panel 1.

In the first open circuit test mode, the first data voltage and the second data voltage are set to the same voltage level, to test whether an open circuit is formed in the data lines L1~L8. Below, the examples are provided using 5 volts as the voltage levels of the first data voltage and the second data voltage, but the present invention is not limited in practice thereto. When the voltage levels of the first data voltage and the second data voltage are both 5 volts in the first open circuit test mode, because of the circuit connection relations described above, the voltage levels on the data lines L1 and L2 and the voltage levels on the data lines L5 and L6 should ideally be the same and are 5 volts, and the voltage levels on the data lines L3 and L4 and the voltage levels on the data lines L7 and L8 are the same and are 5 volts.

However, the data line L1 in the display area AA is broken because of the flaw. As a result, at this time, only the voltage level on one segment of the data line L1 is 5 volts, and the voltage levels on other segments of the data line L1 (electrically connected to the data line L2) and on the data line L2 are not 5 volts because they are not power up. Thus, only a part of the pixel unit column corresponding to the data line L1 lights up, and the whole segment of the pixel unit column corresponding to the data line L2 is darkened.

The data line L3 in the fan-out zone ZFO is broken because of the flaw E2. At this time, following the same mechanism as described above, the voltage level on the whole segment of the data line L3 is 5 volts, but the voltage level on the data line L4 is not 5 volts because it is not power up. Thus, the pixel unit column corresponding to the data line L3 brings up, and the whole segment of the pixel unit column corresponding to the data line L4 does not. In other words, a test technician is able to determine whether the data lines L1~L8 form an open circuit and further to detect an open circuit position according to whether the whole column, or a segment part is darkened in the display frame.

In the first short circuit test mode, the first data voltage and the second data voltage are set to different voltage levels, to test whether a short circuit is formed between the data lines L2 and L3, between the data lines L4 and L5, or between the data lines L6 and L7. Below, the examples are provided using 5 volts as the voltage level of the first data voltage and 0 volts as the voltage level of the second data voltage, but the present invention is not limited in practice thereto. In the first short circuit test mode, because of the circuit connection relations described earlier, the voltage levels on the data lines L1 and L2 and the voltage levels on the data lines L5 and L6 should ideally be the same and are 5 volts, and the voltage levels on the data lines L3 and L4 and the voltage levels on the data lines L7 and L8 are the same and are 0 volts.

Ideally, the data lines L6 and L7 should not be electrically connected to each other; the voltage level on the data line L6 should be 5 volts, and the voltage level on the data line L7 should be 0 volts. Thus, the whole pixel unit column corresponding to the data line L6 lights up ideally with roughly the same brightness. The whole pixel unit column corresponding to the data line L7 should not emit light. However, as described above, the data lines L6 and L7 form a short circuit. At this time, the voltage level on the whole data line L6 is still consistent, but the voltage level decreases correspondingly with the voltage values of the first data voltage and the second data voltage and an impedance between the first data end D1 and the second data end D2. In addition, the data line L7 is electrically connected to the data line L5 through the fourth switch SWD3. Thus, the voltage level on the whole data line L7 is no longer consistent, and it increases gradually from a side nears the second data end D2 to the other side near the fan-out zone ZFO. If a side of the display area AA close to the first peripheral circuit zone Z1 is defined as an upper edge, and a side of the display area AA close to the fan-out zone ZFO is defined as a lower edge, the voltage level on the data line L5 decreases gradually from the upper edge of the display area AA to the lower edge, and the voltage level on the data line L7 increases gradually from the upper edge of the display area AA to the lower edge.

In other words, at this time, the pixel unit column corresponding to the data line L6 dims gradually from the upper edge of the display area AA to the lower edge, and the pixel unit column corresponding to the data line L7 lights up gradually from the upper edge of the display area AA to the lower edge. Thus, a test technician is able to determine whether a short circuit is formed between the data lines L2 and L3, between the data lines L4 and L5, or between the data lines L6 and L7 based on whether a column dims or lights up gradually in a display frame.

In an embodiment, the display panel 1 is further provided with a reset mode. In the reset mode, the first switches SWA1~SWA4, the second switches SWB1~SWB5, the third switches SWC1~SWC3, and the fourth switches SWD1~SWD4 are all turned on, and the first data voltage and the second data voltage are set to an initial value. Therefore, the voltage levels on lines and nodes in the display panel 1 are set to the initial value, to avoid a misjudgment due to a residual charge in the display panel 1. The initial value is, for example, 0 volts, but the present invention is not limited thereto.

In the first open circuit test mode in another embodiment, the first data voltage or the second data voltage is a time-varying value. At this time, ideally, the pixel unit columns corresponding to the data lines L1~L8 light up or dims according to a change of the first data voltage or a change of the second data voltage. When a part of a display frame does not change its brightness in accordance with the first data voltage or the second data voltage, it suggests that an open circuit may be formed in the corresponding data lines L1~L8.

Figure 4:
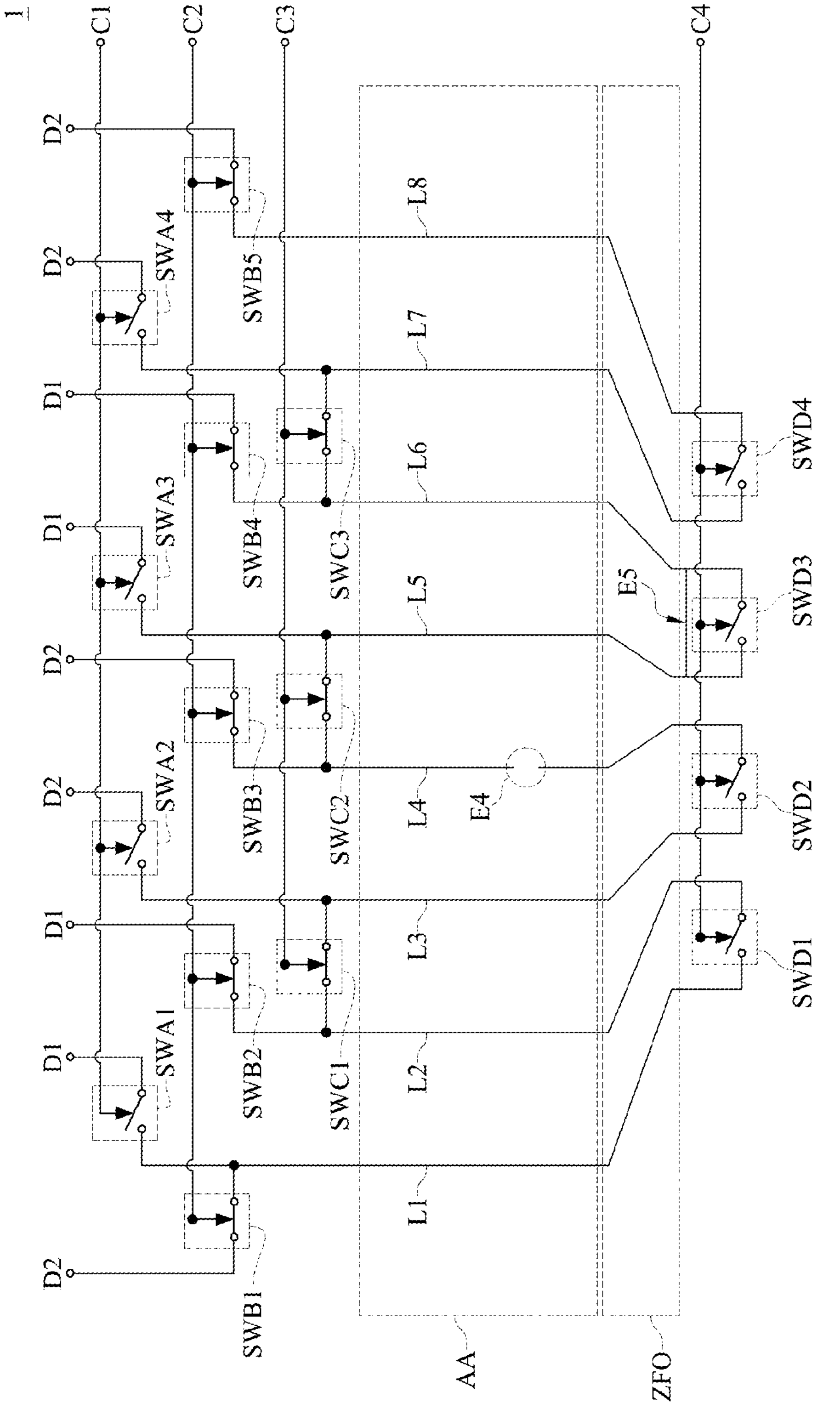
FIG. 4 is an equivalent circuit diagram of the display panel in the second test mode according to FIG. 2 of the present invention.

Referring to FIG. 4, an equivalent circuit diagram of the display panel in the second test mode according to FIG. 2 of the present invention. In the second test mode, the second switches SWB1~SWB5 and the third switches SWC1~SWC3 are turned on, the first switches SWA1~SWA4 and the fourth switches SWD1~SWD4 are not turned on. At this time, the data line L1 is electrically connected to the second data end D2 through the second switch SWB1; the data line L2 is electrically connected to the first data end D1 through the second switch SWB2; the data line L3 is electrically connected to the first data end D1 through the second switch SWB2 and the third switch SWC1; the data line L4 is electrically connected to the second data end D2 through the second switch SWB3; the data line L5 is electrically connected to the second data end D2 through the second switch SWB3 and the third switch SWC2; the data line L6 is electrically connected to the first data end D1 through the second switch SWB4; the data line L7 is electrically connected to the first data end D1 through the second switch SWB4 and the third switch SWC3; and the data line L8 is electrically connected to the second data end D2 through the second switch SWB5.

Thus, ideally, the voltage levels on the data lines L1 and L8 are the second data voltage level, and the voltage levels on the data lines L2 and L3 are the same and are the level of the first data voltage; the voltage levels on the data lines L4 and L5 are the same and are the level of the second data voltage, and the voltage levels on the data lines L6 and L7 are the same and are the level of the first data voltage.

In this embodiment, when a voltage level on a corresponding data line is a high voltage level, the display area circuit transmits a data signal into the pixel units to enable the pixel units to emit light. Each of the data lines L1~L8 corresponds to one pixel unit column in the display area circuit. Thus, in this embodiment, pixel units in the whole pixel unit column corresponding to each of the data lines L2, L3, L6, and L7 emit consistent and roughly the same amount of light, and pixel units in the whole pixel unit column corresponding to each of the data lines L1, L4, L5, and L8 emit consistent and roughly the same amount of light. However, as shown in FIG. 4, in this embodiment, the display panel 1 has, for example, the following flaws. The data line L4 has an open circuit defect in the display area AA because of a flaw E4, and the data lines L5 and L6 form a short circuit defect because of a flaw E5. Thus, the voltage levels on the data lines L1~L8 are not ideal as described above.

In order to test Whether a short circuit or an open circuit is formed in the display panel 1, the second test mode may include a second short circuit test mode and a second open circuit test mode to test the display panel 1.

In the second open circuit test mode, the first data voltage and the second data voltage are set to the same voltage level, to test whether an open circuit is formed in the data lines L1~L8. Below, the examples are provided using 5 volts as the voltage levels of the first data voltage and the second data voltage, but the present invention is not limited in practice thereto. When the voltage levels of the first data voltage and the second data voltage are both 5 volts in the second open circuit test mode, because of the circuit connection relations described above, the voltage levels on the data lines L1~L8 should ideally be the same and are 5 volts.

However, the data line L4 is broken in the display area AA because of the flaw E4. As a result, at this time, only the voltage level on one segment of the data line L4 is 5 volts, and the voltage level on other segment of the data line is not 5 volts voltages because it is not powered up. Thus, only a part of the pixel unit column corresponding to the data line L4 lights up. A test technician is able to determine whether the data lines L1~L8 has an open circuit defect and further to detect an open circuit position according to whether a part of a column is not turned on in the display frame. When the flaw E4 exists in the fan-out zone ZFO, relevant changes can be inferred from the previous content and they are not described here again.

In the second short circuit test mode, the first data voltage and the second data voltage are set to different voltage levels, to test whether a short circuit is formed between the data lines L1 and L2, between the data lines L3 and L4, between the data lines L5 and L6, or between the data lines L7 and L8. Below, the examples are provided using 5 volts as the voltage level of the first data voltage and 0 volts as the voltage level of the second data voltage, but the present invention is not limited in practice thereto. In the second short circuit test mode, because of the circuit connection relations described earlier, the voltage levels on the data lines L2, L3, L6, and L7 should ideally be the same and are 5 volts, and the voltage levels on the data lines L1, L4, L5, and L8 are the same and are 0 volts.

Ideally, the data lines L5 and L6 should not be electrically connected to each other; the voltage level on the data line L5 should be 0 volts, and the voltage level on the data line L6 should be 5 volts. Thus, the whole pixel unit column corresponding to the data line L6 lights up ideally with roughly the same brightness. The whole pixel unit column corresponding to the data line L5 should not emit light. However, as described above, the data lines L5 and L6 form a short circuit, so the voltage levels on the whole data lines L5 and L6 are not consistent, but increase or decrease gradually. If a side of the display area AA close to the first peripheral circuit zone Z1 is defined as an upper edge, and a side of the display area AA close to the fan-out zone ZFO is defined as a lower edge, the voltage level on the data line L6 decreases gradually from the upper edge of the display area AA to the lower edge, and the voltage level on the data line L5 increases gradually from the upper edge of the display area AA to the lower edge.

In other words, at this time, the pixel unit column corresponding to the data line L6 dims gradually from the upper edge of the display area AA to the lower edge, and the pixel unit column corresponding to the data line L5 lights up gradually from the upper edge of the display area AA to the lower edge. Thus, a test technician is able to determine whether a short circuit is formed between the data lines L1 and L2, between the data lines L3 and L4, between the data lines L5 and L6, or between the data lines L7 and L8 based on whether a column dims or lights up gradually in a display frame.

In sum, both the first test mode and the second test mode has the effect of finding whether an open circuit is formed in the data lines L1~L8. In addition, in the first test mode, it can be tested whether a short circuit is formed between the data lines L2 and L3, between the data lines L4 and L5, or between the data lines L6 and L7. In the second test mode, it can be tested whether a short circuit is formed between the data lines L1 and L2, between the data lines L3 and L4, between the data lines L5 and L6, or between the data lines L7 and L8. Thus, it can be tested whether an open circuit is formed in the data lines L1~L8 and whether a short circuit is formed between any adjacent two of the data lines L1~L8 according to the first test mode and the second test mode.

Figure 5:
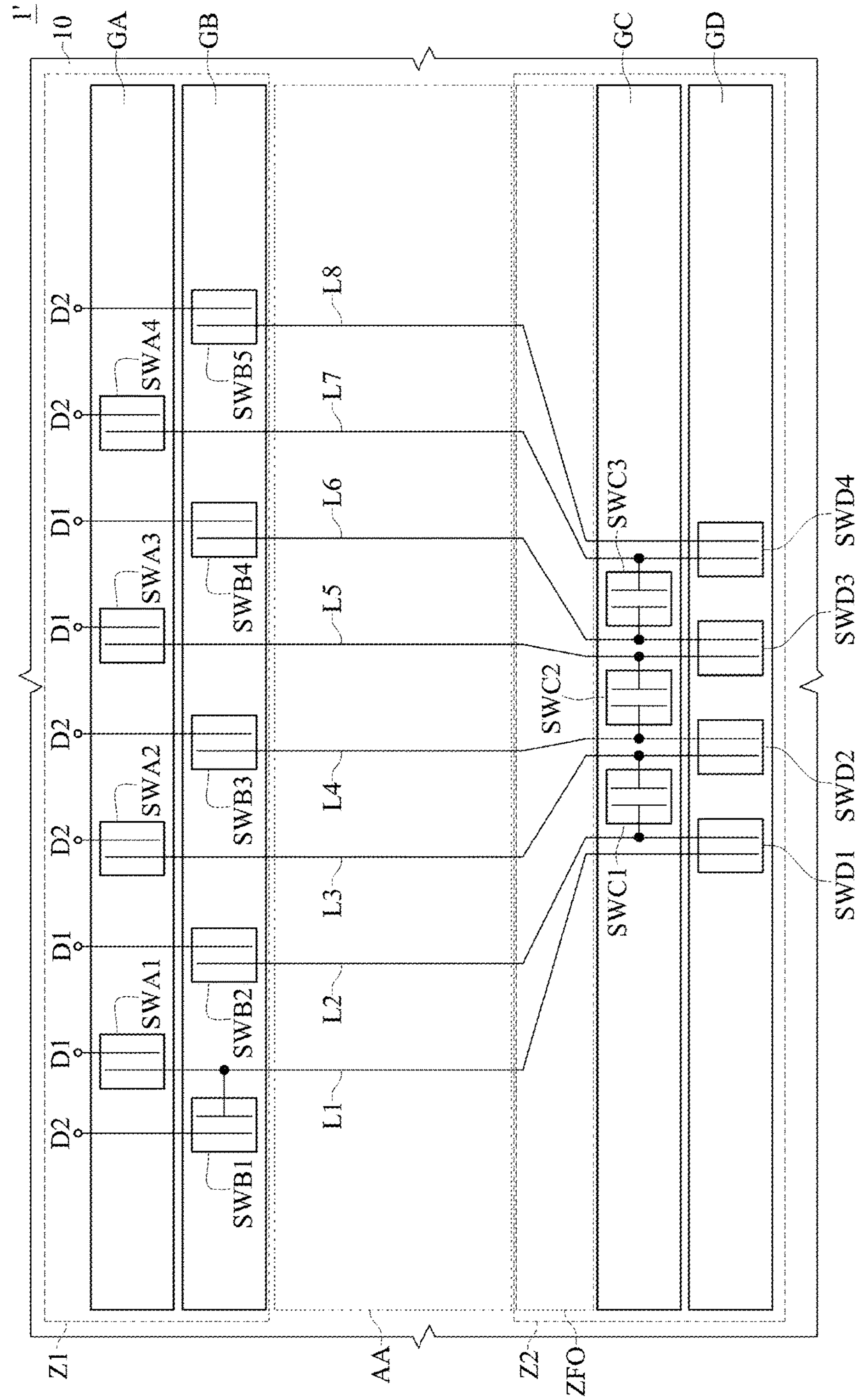
FIG. 5 is a top-view drawing of a display panel according to another embodiment of the present invention.

Other than the implementation aspect in FIG. 1, the display panel 1 further has an implementation aspect as is shown in FIG. 5. Referring to FIG. 5, another implementation aspect of the display panel 1' is illustrated. FIG. 5 is a top-view drawing of a display panel according to another embodiment of the present invention. The difference between the embodiment corresponding to FIG. 5 and the embodiment in FIG. 1 is that, the third switches SWC1~SWC3 are located in the second peripheral circuit zone Z2. In this embodiment, the previously described test modes are also applicable to the display panel 1' and have the same effects. Relevant details are as described earlier and not provided again here.

To sum up, the present invention provides a display panel and a method for verifying data lines thereon. In the display panel, the switches are divided into upper and lower parts relative to the display area, thereby reducing the number of switches below a driving IC of the display panel to match the decreasing line width and pitch of the driving IC of the display panel, to successfully test the more miniaturized driving IC of the display panel, making it possible to determine whether an open circuit is formed in the data lines of the display panel or to test whether a short circuit is formed between the data lines of the display panel. In addition, the display panel provided by the present invention can further test whether a short circuit is formed between lines in the same layer or from different layers, thereby solving the previous problem where a test can only be performed between certain lines to see whether a short circuit is formed.

While the present invention has been disclosed above with the embodiments, these embodiments are not intended to limit the present invention. All alterations and modifications fail within the scope of the invention, without departing from the spirit and scope of the invention. Regarding the scope of patent protection as defined by the scope of the present invention, refer to the appended claims.

What is claimed is:

1. A display panel, comprising:

a substrate, wherein a first peripheral circuit zone, a second peripheral circuit zone, and a display area are defined on a first surface of the substrate, and the display area is located between the first peripheral circuit zone and the second peripheral circuit zone;

a display area circuit, located in the display area;

N data lines, wherein each of the N data lines crosses the display area circuit from the first peripheral circuit zone to the second peripheral circuit zone, and N is a positive integer greater than 1;

first switches, located in the first peripheral circuit zone, selectively and electrically connect (2k−1)-th data lines of the N data lines to a first data end or a second data end according to a first signal, wherein k is a positive integer and is not greater than N/2;

second switches, located in the first peripheral circuit zone, selectively and electrically connect 2k-th data lines of the N data lines to the first data end or the second data end according to a second signal;

third switches, located on the first surface, selectively and electrically connect the 2k-th data lines of the N data lines to (2k+1)-th data lines of the N data lines according to a third signal; and fourth switches, located in the second peripheral circuit zone, selectively and electrically connect the 2k-th data lines of the N data lines to the (2k−1)-th data lines of the N data lines according to a fourth signal.

2. The display panel according to claim 1, wherein the second switches are located between the first switches and the display area circuit.

3. The display panel according to claim 2, wherein the third switches are located in the first peripheral circuit zone.

4. The display panel according to claim 3, wherein the third switches are located between the second switches and the display area circuit.

5. The display panel according to claim 1, wherein the third switches are located in the second peripheral circuit zone.

6. The display panel according to claim 5, wherein the third switches are located between the fourth switches and the display area circuit.

7. The display panel according to claim 1, wherein the first signal and the fourth signal are the same, and the second signal and the third signal are the same.

8. The display panel according to claim 1, wherein the second switches selectively and electrically connect (4m−2)-th data lines of the N data lines to the first data end, and to electrically connect (4m)-th data lines of the N data lines to the second data end, wherein m is a positive integer and is not greater than N/4.

9. A method for verifying data lines on a display panel, applicable to the display panel according to claim 1, the method comprising:

providing a first voltage for the first data end;

providing a second voltage for the second data end, wherein the second voltage is different from the first voltage;

controlling the first switches and the fourth switches to operate in a first state;

controlling the second switches and the third switches to operate in a second state, wherein the first state is different from the second state; and determining status of the N data lines according to a pattern shown in the display area.

10. The method according to claim 9, wherein the first state is turn-on and the second state is turn-off, and the step of determining status of the N data lines comprises deciding whether the N data lines are broken and determining whether the 2x-th data lines and the (2x+1)-th data lines of the N data lines are short-circuited, wherein x is a positive integer and is less than N/2.

11. The method according to claim 9, wherein the first state is turn-off and the second state is turn-on, and the step of determining status of the N data lines comprises deciding whether the N data lines are broken and determining whether the 2x-th data lines and the (2x−1)-th data lines of the N data lines are short-circuited, wherein x is a positive integer and is less than N/2.

12. A display panel, comprising:

a substrate, wherein a first peripheral circuit zone, a second peripheral circuit zone, and a display area are defined on a first surface of the substrate, and the display area is located between the first peripheral circuit zone and the second peripheral circuit zone;

a display area circuit, located in the display area;

N data lines, wherein each of the N data lines crosses the display area circuit from the first peripheral circuit zone to the second peripheral circuit zone, and N is a positive integer greater than 1;

first switches, located in the first peripheral circuit zone, selectively and electrically connect (2k−1)-th data lines of the N data lines to a first data end or a second data end according to a first signal, wherein k is a positive integer and is not greater than N/2;

second switches, located in the first peripheral circuit zone, selectively and electrically connect 2k-th data lines of the N data lines to the first data end or the second data end according to a second signal;

third switches, located on the first surface, selectively and electrically connect the 2k-th data lines of the N data lines to (2k+1)-th data lines of the N data lines according to a third signal; and fourth switches, located in the second peripheral circuit zone, selectively and electrically connect the 2k-th data lines of the N data lines to the (2k−1)-th data lines of the N data lines according to a fourth signal, wherein the first switches selectively and electrically connect (4m−3)-th data lines of the N data lines to the first data end, and to electrically connect (4m−1)-th data lines of the N data lines to the second data end, wherein m is a positive integer and is not greater than N/4.

13. The display panel according to claim 12, wherein the first signal and the fourth signal are the same, and the second signal and the third signal are the same.

14. The display panel according to claim 12, wherein the second switches selectively and electrically connect (4m−2)-th data lines of the N data lines to the first data end, and to electrically connect (4m)-th data lines of the N data lines to the second data end, wherein m is a positive integer and is not greater than N/4.

15. The display panel according to claim 13, wherein the second switches selectively and electrically connect (4m−2)-th data lines of the N data lines to the first data end, and to electrically connect (4m)-th data lines of the N data lines to the second data end, wherein m is a positive integer and is not greater than N/4.

16. A method for verifying data lines on a display panel, applicable to the display panel according to claim 12, the method comprising:

providing a first voltage for the first data end;

providing a second voltage for the second data end, wherein the second voltage is different from the first voltage;

controlling the first switches and the fourth switches to operate in a first state;

controlling the second switches and the third switches to operate in a second state, wherein the first state is different from the second state; and determining status of the N data lines according to a pattern shown in the display area.

17. The method according to claim 16, wherein the first state is turn-on and the second state is turn-off, and the step of determining status of the N data lines comprises deciding whether the N data lines are broken and determining whether the 2x-th data lines and the (2x+1)-th data lines of the N data lines are short-circuited, wherein x is a positive integer and is less than N/2.

18. The method according to claim 16, wherein the first state is turn-off and the second state is turn-on, and the step of determining status of the N data lines comprises deciding whether the N data lines are broken and determining whether the 2x-th data lines and the (2x−1)-th data lines of the N data lines are short-circuited, wherein x is a positive integer and is less than N/2.

* * * * *